United States Patent Office 3,488,919
Patented Jan. 13, 1970

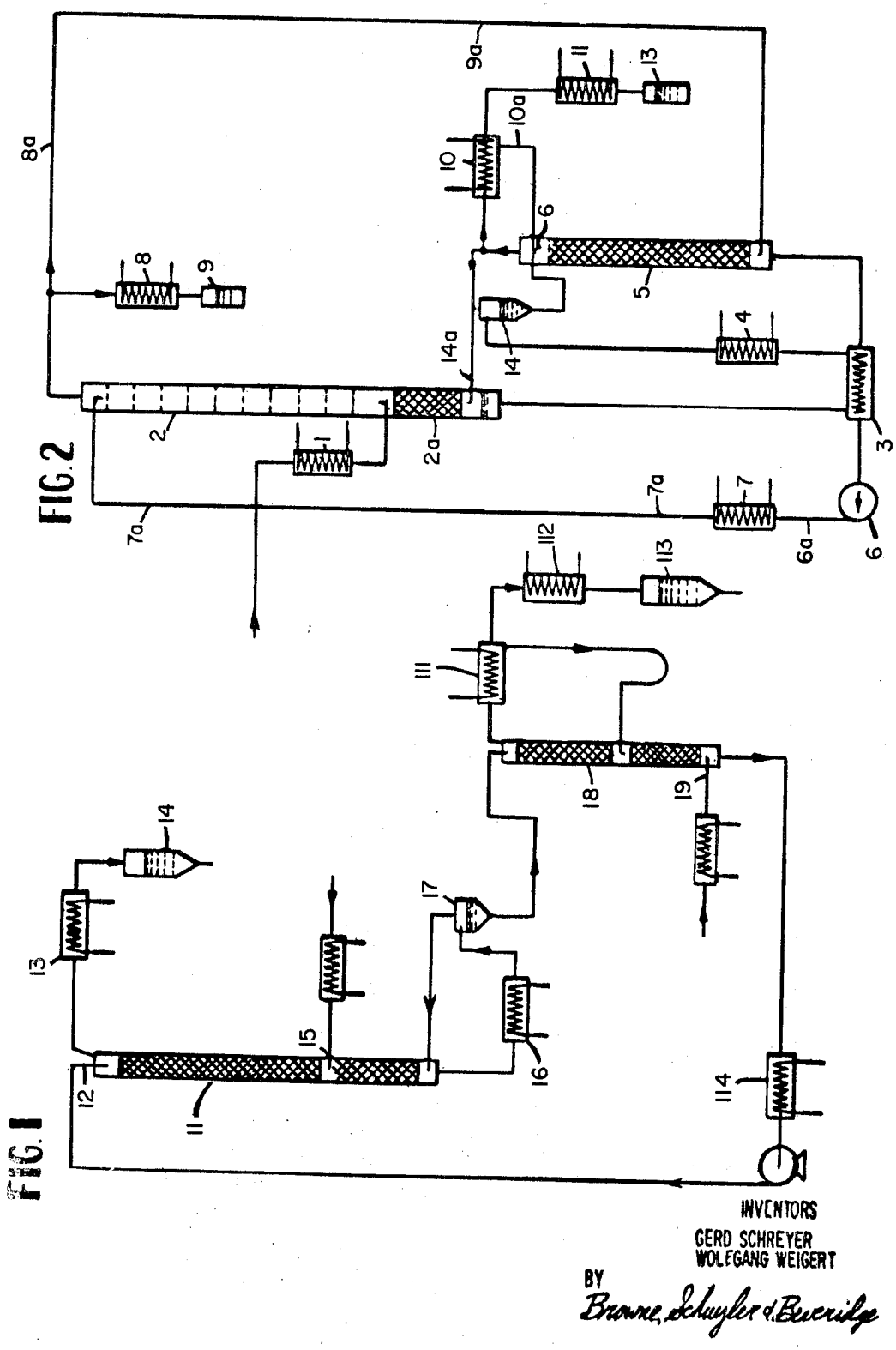

3,488,919
PROCESS FOR THE PURIFICATION OF
HYDROGEN CYANIDE
Gerd Schreyer, Grossauheim, and Wolfgang Weigert, Offenbach am Main, Germany, assignors to Deutsche Gold- und Silber-Scheideanstalt vormals Roessler, Frankfurt am Main, Germany
Filed Sept. 23, 1968, Ser. No. 761,633
Claims priority, application Germany, Oct. 3, 1967, 1,271,091; Feb. 23, 1968, 1,667,784
Int. Cl. B01d 47/06
U.S. Cl. 55—38                              9 Claims

ABSTRACT OF THE DISCLOSURE

Hydrogen cyanide is purified and freed from benzene contamination by washing the hydrogen cyanide with a high boiling hydrocarbon at a temperature of 20 to 50° C.

---

This invention relates to the purification of hydrogen cyanide, and more especially to the removal of benzene from hydrogen cyanide.

Hydrogen cyanide is used in the synthesis or preparation of many organic and inorganic products. Often, available hydrogen cyanide is contaminated with benzene and the benzene content may be as high as 10,000 p.p.m. Contamination with benzene is a substantial problem, especially when hydrogen cyanide is used in catalytic synthesis.

Accordingly, it is an object of this invention to provide a process for the purification of hydrogen cyanide.

Another object of this invention is to provide a process for removing benzene from hydrogen cyanide.

In accomplishing these objects, one feature of this invention resides in washing hydrogen cyanide, contaminated with benzene, with a washing liquor comprising a high boiling hydrocarbon or hydrocarbon mixture at a temperature of 20 to 50° C., the hydrocarbon or hydrocarbon mixture having a vapor pressure of not more than 1.0 torr at this temperature, to thereby absorb benzene in the washing liquor, the washing liquor being simultaneously saturated with hydrogen cyanide, and produce a hydrogen cyanide having an exceedingly reduced benzene content. Following this, the washing liquor is heated at 60 to 200° C. to remove the absorbed hydrogen cyanide therefrom. Then, the washing liquor is blown at 60 to 250° C. to remove the absorbed benzene impurity therefrom.

Other objects, features and advantages of the present invention will become apparent to those skilled in the art from the detailed description of the invention which follows, and from the drawings wherein FIGS. 1 and 2 are schematic representations of a system of apparatus for use in practicing the process of this invention.

It has now been found that the benzene contents of hydrogen cyanide can be lowered very considerably if the benzene containing hydrogen cyanide is washed in the countercurrent with a high-boiling hydrocarbon or hydrocarbon mixture, whose vapor pressure at the absorption temperature of 20 to 50° C. amounts to no more than 1.0, preferably 0.05 torr and less. The hydrogen cyanide is then driven out of the benzene containing washing liquid saturated with said hydrogen cyanide, through heating from 60° to 200° C. and the washing liquor now free of hydrogen cyanide is freed of benzene through blowing out at 60° C. to 250° C.

Preferably, the absorption and washing step takes place at ambient temperature.

A mixture of alkyl benzene, known commercially as "Shellsol ®", or like distillates of aliphatics with a boiling range of from 175 to 210° C. can be used for example as a washing liquor. Hydrocarbons or mixtures of hydrocarbons are used in preference, which at the absorption temperature have a vapor pressure of at the most 0.05 torr, suitably a pressure of even 0.01 torr and less. For this purpose alkylized benzene with longer alkyl ranges are pertinent, such as isododecyl benzene, decyl benzene, undecyl benzene, dodecyl benzene, higher paraffinic hydrocarbons, such as hexadecane, octadecane or their mixtures and petroleum fractions in the boiling range of above 150° C. Such hydrocarbons do not react with hydrogen cyanide and are very good benzene solvents. Besides that, they are stable at the blowing out temperature and they do not react with the steam, used preferably as the blowing out agent. Besides that, inert gases such as nitrogen or carbon dioxide can be used as exhaust agents. The exhaust agents are supposed to be practically insoluble in the washing agent. It is also possible to use a small portion of the highly purified hydrogen cyanide itself as exhaust agent, if one can afford losses in yield of benzene-free hydrogen cyanide, occurring as a result. The exhaust temperature is preferably between 100 to 200° C.

The washing solvents usually are added to the crude hydrogen cyanide in a ratio of about 100 kg. hydrogen cyanide:1 m.³ solvent, but other ratios can be used. The quantities of washing agent are kept as small as possible.

The hydrogen cyanide, obtained according to the process, is practically free of benzene; the benzene content is less than 20 p.p.m. The effect of the process is not limited to benzene impurities, and other impurities of the crude hydrogen cyanide, which are dissolved in the washing agent, are also removed at the same time.

Through heating according to the invention of the washing solution saturated with hydrogen cyanide prior to its entering into the desorption stage, to a temperature where the partial pressure of the benzene is still extraordinarily low, the yield of benzene-free hydrogen cyanide is influenced favorably. The hydrogen cyanide which has only little benzene content, and which was driven out of the washing solution, is taken back once more into the washing column and is washed again, whereupon the degree of purity according to the invention has been reached. The washing agent solution entering the desorption is then practically free of hydrogen cyanide. Here the benzene is driven out through blowing out and, if need be, through increase of the temperature.

The invention will be explained in more detail on the basis of FIG. 1 and Examples 1 and 2.

Hydrogen cyanide is introduced in vapor form in the lower part of column 11 at 15 and is washed in counterflow with a high boiling solvent fed in at 12. At the head of this column the highly purified hydrogen cyanide is drawn off and is condensed via the cooler 13 in the receiver 14. The washing liquor running out from the sump of the column 11 contains the impurity and is saturated with hydrogen cyanide. The latter is driven out through heating in the heat exchanger 16, is separated from the washing liquor in the separator 17 and is washed in the lower part of the column 11 of portions of impurities, which in correspondence to their vapor pressure were desorbed along with the rest. The hot washing liquor is put on the head of the desorption column 18 in which the small quantities of impurities, dissolved in the washing liquor, are blown out by gas or steam in counterflow, which are introduced in the lower part of the column at 19. The disturbing impurity is drawn off at the head of this column and the vapors are cooled at 111 just shortly above their boiling point. The small quantity of washing liquor which separates during this is again taken back to the desorption column. Afetr complete cooling in the ooler 112, the impurity in the receiver 113 can be separated out together with small quantities of hydrogen cyanide.

The purified washing liquor after cooling down to the temperature of the absorption column in the cooler 114 is again put into column 11.

When absorption and washing liquors with a higher vapor pressure are used, it will be necessary to purify the hydrogen cyanide leaving the column 11 prior to its condensation with liquid hydrogen cyanide, either by condensing first a partial quantity through a cooling element placed on the column, or else returning a partial current of the condensed, pure hydrogen cyanide above the addition for the absorption liquid into the column.

Example 1

In the apparatus, illustrated in FIG. 1, hydrogen cyanide which contained 3500 p.p.m. of benzene was purified. Dodecyl benzene was used as washing liquor at a temperature of 27° C. and superheated steam was used for blowing out in the desorption 18. In this case the temperature was at 160° C. At the head of the absorption column 11, more than 99% of the hydrogen cyanide with a benzene content of less than 25 p.p.m. were obtained. The remainder was received as an aqueous solution in the receiver 113.

Example 2

In the case of purification of a hydrogen cyanide contaminated with 3500 p.p.m. of benzene, a partial current of the already purified hydrogen cyanide was used for blowing out the impurity instead of the steam used in Example 1 for desorption. 90% of the hydrogen cyanide was recovered as a highly purified product, containing less than 20 p.p.m. of benzene. 10% of the hydrogen cyanide accured as an impurity with 3.5% of benzene.

As mentioned at the outset, a small portion of the highly purified hydrogen cyanide itself can also be used as an exhaust agent. In that case, however, the yield of hydrogen cyanide free of benzene is lower.

It has now been found, furthermore, that even in the case of already purified hydrogen cyanide as an exhaust agent, the final yield of purified hydrogen cyanide can be raised considerably if an overwhelming part of the benzene containing hydrogen cyanide leaving at the head of the desorption column will be returned once more to the absorption column and washed until freed of benzene.

The portion of hydrogen cyanide that is to be returned to the absorption column depends on the original benzene content of the crude hydrogen cyanide. In the case of higher benzene contents, perhaps in the area of from 3000 to 5000 p.p.m., this portion will be smaller than in the reverse case, i.e., in the area from 2000 to 3000 p.p.m. Generally, 85 to 95% of the hydrogen cyanide used as an exhaust agent will be returned again. The rest, which is not returned, leaves the system and again removes an equal quantity of benzene to that which is injected anew with every cycle. This residue amounts to 0.5 to 1.5%, related to the originally used crude hydrogen cyanide. It is either abandoned, or else used for another purpose, where the high benzene content is not disturbing.

This mode of operation is described in more detail on the basis of FIG. 2 and Example 3.

Crude hydrogen cyanide with a benzene content of, for example, 2500 p.p.m. is introduced via evaporator 1 into the absorption column 2 and the benzene is washed out in said column in counterflow with a high-boiling aromatic solvent, for example, alkyl benzene whose alkyl radical contains 12 carbon atoms, to a residual benzene content of less than 50 p.p.m. The purified hydrogen cyanide leaves the column 2 via the head. The solvent, running off at the sump of column 2, is heated to about 150° C. in the heater 4 after passing through the heat exchanger 3, in order to drive out dissolved hydrogen cyanide, and flows via the separator 14 and distributor 15 to the desorption column 5. Hydrogen cyanide, separated in separator 14, which contains considerable benzene, is reintroduced via pipe 14a at the lowest part of the absorption column 2a, then, after washing out the benzene, it leaves column 2 again via the head and together with the remaining hydrogen cyanide, free of benzene, is collected via condenser 8 in the receiver 9.

The benzene containing solvent, having a temperature of already 150° C. is freed of its benzene at 150 to 180° C. in the desorption column 5 by blowing out with a partial current of, for example, 10% of the already cleared hydrogen cyanide, which is introduced in counterflow into column 5 via pipe 8a and 9a, and is then introduced into the absorption column 2 by means of pump 6 via pipe 5a, 6a, 7a after passing through heat exchanger 3 and cooler 7.

The hydrogen cyanide used as an exhaust agent and now strongly benzene containing leaves the desorption column 5 via the head. For example, 10% of this hydrogen cyanide used as exhaust agent is cooled in the separator 10 to just above the boiling point of the benzene, in order to separate out any aromatic solvent that has gone along, and which is again returned via pipe 10a to the desorption column 5, whereupon the hydrogen cyanide is condensed completely in a second cooler 11 and captured entirely in the receiver 13. This 10% of the exhaust agent, i.e., 1% of the crude hydrogen cyanide, contain the entire benzene brought in in a cycle by the crude hydrogen cyanide.

Thus, 90% of the benzene containing hydrogen cyanide, together with the hydrogen cyanide obtained in the separator 14 are fed into the lower part 2a of the absorption column 2 for washing and can then also be obtained as head product of this column, free of benzene. In this manner one can obtain, for example, 99% of the fed-in hydrogen cyanide as a product free of benzene. In the case of absorption and desorption columns, which have the required theoretical number of exchange plates for this required purity, the hydrogen cyanide low in benzene contains less than 50 p.p.m. of benzene.

Example 3

For purification of hydrogen cyanide contaminated with 2500 p.p.m. of benzene, the apparatus of FIG. 2 was used. 1200 g. crude hydrogen cyanide per hour was introduced via evaporator 1 into the column 2, in which it was washed in counterflow at 30 to 40 C. with 1 liter dodecyl benzene/hr. It was possible to obtain pure hydrogen cyanide with less than 50 p.p.m. of benzene at the head of this column. The washing agent flowed from the sump of the column (2 and 2a) via heat exchanger (3 and 4) and was heated to 180° C. In this case the dissolved hydrogen cyanide was desorbed and was separated in the separator 14 from the washing liquor. Since however the hydrogen cyanide was desorbed and was strongly benzene containing it was necessary to return it once more into the lowest part of the absorption column 2a for purification. The benzene containing washing agent flowed from the separator to the desorption column 5, was blown out in it with a partial current of 9% hydrogen cyanide, low in benzene and obtained at the head of the absorption column 2 via pipe 8a and 9a in counterflow, and was pumped again from the lower end of the desorption column 5 and after cooling via pipes 5a, 6a and 7a to the absorption column 2. The gas mixture (benzene + hydrogen cyanide + dodecyl benzene), leaving at the head of the desorption column 5, was also put, at the rate of 90%, via pipe 14a, into the lowest part 2a of the absorption column 2. 10% of the gas mixture, however, was removed from circulation and cooled in the separator 10 to 85° C., whereby mostly dodecyl benzene that had come along, was separated, which was put back again into the desorption column 5. The hydrogen cyanide-benzene mixture was subsequently liquefied in the condenser 11. It was possible to obtain 1.2% of the fed-in quantity of crude hydrogen cyanide with almost the entire quantity of benzene in the receiver 13. In the receiver 9, more than 98.5% of the crude hydrogen cyanide used were obtained as a product low in benzene.

While there have been shown and described and pointed out the fundamental novel features of the invention as applied to the preferred embodiment, it will be understood that various omissions and substitutions and changes in the details of the process may be made by those skilled in the art without departing from the spirit of the invention. It is the intention, therefore, to be limited only as indicated by the scope of the following claims.

What is claimed is:
1. Process for the purification of hydrogen cyanide contaminated with benzene comprising the steps of:
   (1) washing the hydrogen cyanide with washing liquor containing a high boiling hydrocarbon or hydrocarbon mixture at a temperature of 20° to 50° C., said hydrocarbon or hydrocarbon mixture having a vapor pressure of not more than 1.0 torr at said temperature, to thereby absorb benzene in said washing liquor, the washing liquor being simultaneously saturated with hydrogen cyanide and produce a hydrogen cyanide having an exceedingly reduced benzene content,
   (2) heating said washing liquor at 60° to 200° C. to remove hydrogen cyanide therefrom, and
   (3) blowing said washing liquor at 60° to 250° C. to remove benzene therefrom.
2. Process as defined in claim 1 wherein said hydrocarbon mixture has a vapor pressure of not more than 0.05 torr at said temperature.
3. Process as defined in claim 1 wherein said washing liquor is an alkyl benzene.
4. Process as defined in claim 3 wherein said washing liquor is isododecylbenzene, decylbenzene, undecylbenzene, dodecylbenzene, or mixtures thereof.
5. Process as defined in claim 1 wherein said washing liquor is hexadecane, octadecane, or mixtures thereof.
6. Process as defined in claim 1 wherein said washing liquor is a petroleum fraction having a boiling point of more than 150° C.
7. Process as defined in claim 1 wherein said washing liquor is blown with steam in step (3).
8. Process as defined in claim 1 wherein said washing liquor is blown with purified hydrogen cyanide in step (3).
9. Process as defined in claim 8 wherein 85 to 95% of the applied amount of hydrogen cyanide blowing agent, after blowing said washing liquor therewith in step (3), is recycled to step (1).

References Cited

UNITED STATES PATENTS 2,756,841   7/1956   Asendorf _____ 55—68 X

REUBEN FRIEDMAN, Primary Examiner

R. W. BURKS, Assistant Examiner

U.S. Cl. X.R.

55—51, 68